July 31, 1951 G. M. BROWN 2,562,694
STAIR-STEP WAVE GENERATOR
Filed July 17, 1948 2 Sheets-Sheet 1
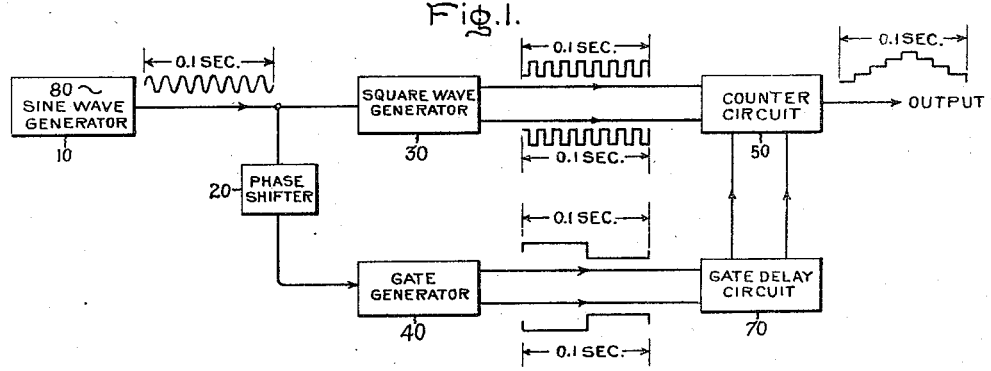
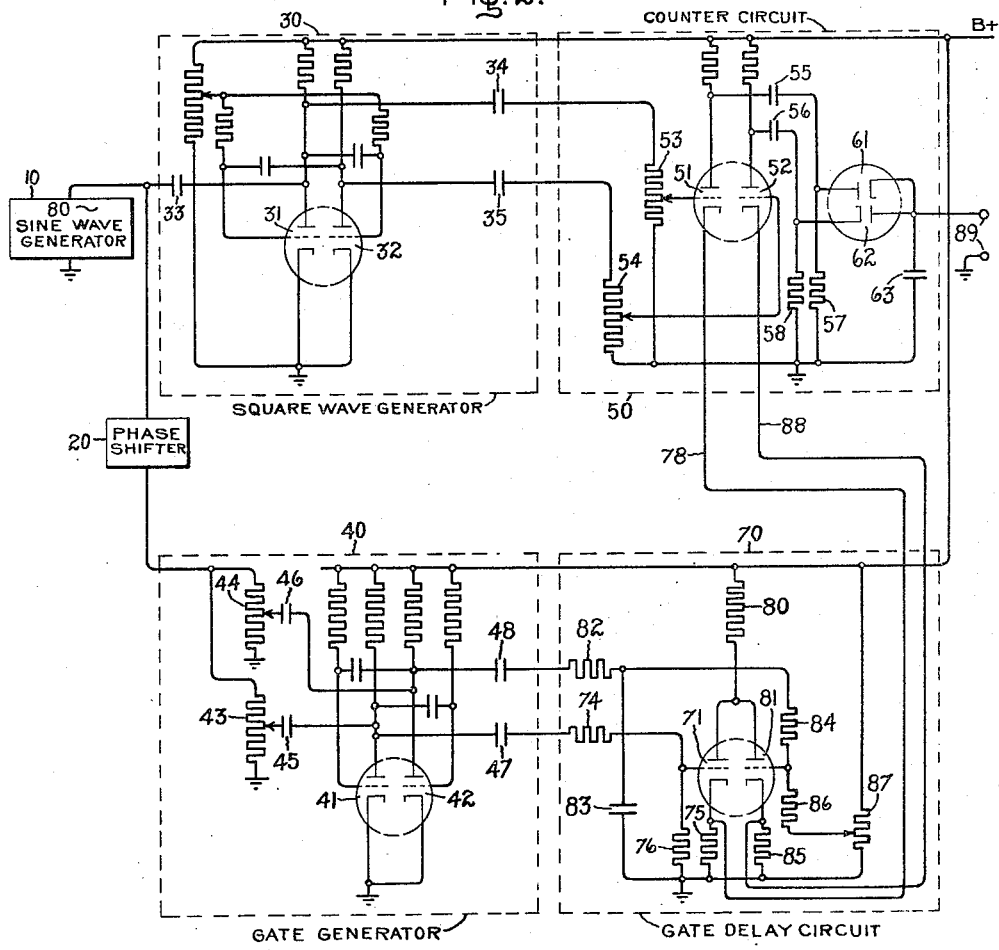
Inventor:
George M. Brown,
by Merton D Moore
His Attorney.

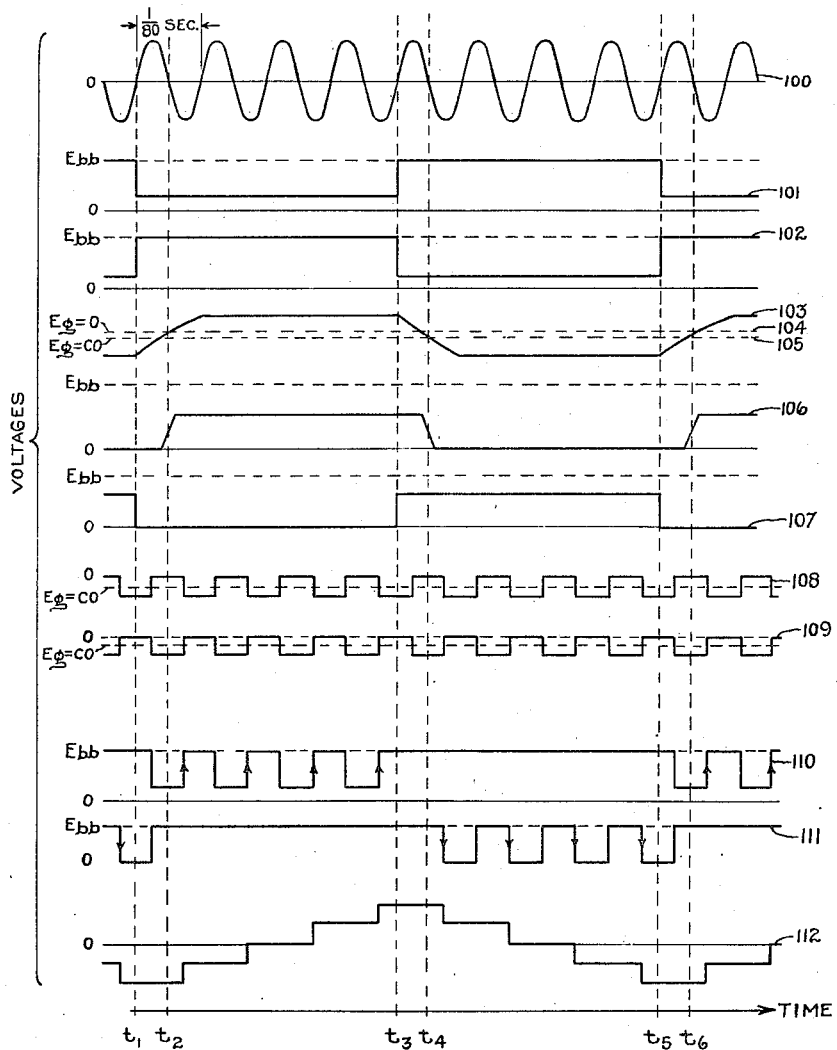

Patented July 31, 1951

2,562,694

UNITED STATES PATENT OFFICE 2,562,694

STAIR-STEP WAVE GENERATOR

George M. Brown, North Tarrytown, N. Y., assignor to General Electric Company, a corporation of New York Application July 17, 1948, Serial No. 39,329

8 Claims. (Cl. 250—27)

This invention relates to non-sinusoidal voltage generators generally, and more particularly to a generator using electronic valves for producing a stair-step wave, that is, a wave alternately rising and falling in a number of small increments, at spaced intervals, these increments occurring practically instantaneously with respect to intervals of constant amplitude interposed between them.

An object of this invention is to provide an improved stair-step generator in which the steps or increments of the wave occur at accurately fixed intervals in synchronism with a reference source of alternating voltage.

Another object of this invention is to provide an improved symmetrical stair-step generator in which the output wave rises and falls in a number of substantially equal steps at accurately fixed intervals.

For additional objects, and for a better understanding of the invention, attention is now directed to the following description and accompanying drawings, and also to the appended claims in which the features of the invention believed to be novel are particularly pointed out.

In the accompanying drawings,

Fig. 1 illustrates, in simplified box form, a complete system for generating a symmetrical stair-step voltage in accordance with the invention;

Fig. 2 illustrates schematically the circuit details of the generating system of Fig. 1;

Fig. 3 shows a series of curves on a common time scale, graphically illustrating different voltage wave forms appearing in different parts of the generator over a complete period of the stair-step voltage.

Referring to the drawings, Fig. 1 shows a sine wave generator 10 supplying a voltage of suitable frequency for the particular form of stair-step wave desired. For purposes of illustration, it is assumed that this frequency is 80 cycles per second. This voltage is supplied to a square wave generator 30 and also to a phase shifter 20. The square wave generator supplies two symmetrical square wave voltages of the same frequency, one being 180° out of phase from the other, to a countercircuit 50. The phase shifter 20 transmits the sinusoidal voltage with an adjustable phase delay to a gate generator 40, which supplies two symmetrical square wave voltages, one being 180° out of phase from the other, to a gate delay circuit 70. The period of the square wave voltage of the gate generator is a multiple of the period of the sine wave generator and in this particular embodiment the period is four times that of the sine wave generator. The gate delay circuit supplies two voltages to the countercircuit 50, the first being a wave coresponding in phase to one of the original square wave gate voltages and the second being another substantially square wave gate voltage retarded in phase by approximately one-half of a period of the wave from the sine wave generator. The output of the countercircuit is illustrated as a symmetrical stair-step voltage of a period equal to eight times the period of the sine wave voltage, the duration of each step in it, both ascending and descending, being equal to one period of the sine wave voltage.

In Fig. 2, the circuit elements are arranged in groups performing the same functions, and, within dashed rectangles, bearing the same reference numerals as the corresponding boxes of Fig. 1. The sine wave generator 10 has not been elaborated since any type of sine wave generator, either electro-mechanical or electronic, may be employed. The phase shifter 20 can be any type of electrical network which will give an adjustable phase delay. The square wave generator 30 is a conventional, direct-coupled, stabilized multi-vibrator comprising two triode valves 31 and 32, shown within a common tube envelope. The multivibrator is triggered by a voltage from sine wave generator 10, coupled to the anode of valve 31 by means of capacitance 33. Two square wave output voltages of opposite phase are coupled out from the anodes of valves 31 and 32 through capacitances 34 and 35, respectively.

The sinusoidal input voltage, of a frequency of 80 cycles per second, is illustrated by curve 100 in Fig. 3. The square wave output voltage from the anode of valve 31 is illustrated by curve 108 in Fig. 3, and that of valve 32 by curve 109. The output voltages from valves 31 and 32 are identical square waves 180° out of phase from each other.

The gate generator 40 comprises two triode valves 41 and 42 connected in a multi-vibrator circuit employing capacitive feed-back. This circuit oscillates between two conditions in which one or the other of the two valves is fully conducting and the remaining valve is cut off. As is well known, such a circuit may be triggered from one condition to the other by the application, to one or the other control grid, of a triggering voltage of proper polarity and amplitude. The maximum rate of switching is determined by the time constants of the anode circuits and the magnitudes of the various operating voltages. In the circuit shown, the sine wave triggering voltage from phase shifter 20 is applied to the anodes of valves 41 and 42, and, through the feed-back capacitors, to the control grids of valves 42 and 41 respectively. The circuit constants are adjusted so that the gate generator operates at a desired submultiple of the sine wave frequency. Thus, the triggering voltage for valve 41 is coupled through potentiometer 44 and capacitor 46 and that for valve 42 is similarly coupled through potentiometer 43 and capacitor 45. The amplitude of the triggering voltage for each valve may be separately adjusted by moving the tap on the respective potentiometer. By this means the number of periods of the triggering voltage comprised in one period of the output of the gate generator is controlled.

The output voltage of valve 41 is represented by curve 101 in Fig. 3 and, as shown, consists of a symmetrical square wave whose period is eight times the period of the output of the sine wave generator. The output of valve 42 is a similar square wave reversed in phase by 180°, and is represented by curve 102 in Fig. 3.

The gate voltages applied to countercircuit 50 are derived from the square waves 101 and 102. One of them is in phase with wave 101 but, for reasons that will shortly appear more fully, the other has a small time delay with respect to wave 102, of approximately one-half of the period of the sinusoidal voltage from sine wave generator 10. This small time delay is provided by the gate delay circuit 70 which comprises two valves 71 and 81 connected as cathode coupled amplifiers with a common anode impedance 80. The square wave from valve 41 of the gate generator is coupled directly to the grid of valve 71 through a resistance 74 connected in series with the output coupling capacitance 47 of valve 41. Resistance 74 serves as a grid current limiter on the positive half of the square wave input and resistance 76 provides the required grid bias through grid current flow. The square wave applied to the grid drives it alternately from a voltage below cut-off to a voltage above saturation, so that the output voltage 107 taken across the cathode resistor 75 by conductor 78 is exactly similar to the grid input voltage 101 and of the same phase.

The square wave appearing on the anode of valve 42 of the gate generator is coupled to the grid of valve 81 through an integrating circuit consisting of resistance 82 and capacitance 83. The remainder of the input coupling circuit comprises grid current limiting resistance 84, biasing resistance 86, and a potentiometer 87 connected between the B+ voltage and ground, which determines the operating potential of the grid. The time constant of the integrating circuit, consisting of resistance 82 and capacitance 83, is chosen such that when a square wave voltage is applied to it, capacitance 83 charges at the rate illustrated by the exponentially rising portions of curve 103 in Fig. 3. The magnitude of the square wave input voltage to the integrating circuit is such as to drive it from a point considerably below cut-off to a point considerably above saturation. The saturation voltage and the cut-off voltage of the grid for valve 81 are represented by lines 104 and 105, respectively, in Fig. 3. The total change of voltage on the grid is made large enough so that the transition from cut-off to saturation is made in a comparatively short interval of time, in spite of the fact that the transition occurs on portions of curve 103 bearing an exponential slope. Accordingly, the output voltage at the cathode of valve 81 and appearing across resistor 85 is represented by curve 106 in Fig. 3 in which the portions of the curve showing a change of voltage, while they are not strictly vertical, have a sufficient rate of rise and fall that the time interval over which the change occurs is only a small fraction of a period of the voltage of the sine wave generator. It has been found in practice that this wave is sufficiently square to be used as a gating voltage for the function required. The gate delay valves 71 and 81, through their connections as cathode coupled amplifiers, also serve to provide the proper impedance matches to apply the gate voltages by means of conductors 78 and 88 to the cathodes of valves 51 and 52, respectively.

The countercircuit 50 comprises two triode valves 51 and 52, which are coupled to receive the output of square wave generator 30 from adjustable taps on potentiometer 53 connected to capacitance 35 and on potentiometer 54 connected to capacitance 34. When it is desired that the output be a symmetrical stair-step voltage, valves 51 and 52 are provided with identical circuit components and thus the anode coupling capacitances 55 and 56 are equal, as are also the discharge resistances 57 and 58. The coupling capacitance 55 is connected to a charging capacitance 63 through a series connection with a diode valve 61 which permits unidirectional current flow from capacitance 55 to capacitance 63 but not in the other direction. Similarly, the coupling capacitance 56 is connected to charging capacitance 63 through a series connection with a diode valve 62 but which permits unidirectional current flow in the other direction only, namely, from capacitance 63 to capacitance 56.

In operation, the gate voltage 107, applied to the cathode of valve 51, and gate voltage 106, applied to the cathode of valve 52, render each valve alternately operative or inoperative for a period of time determined by the duration of the respective gates. Thus, referring to Fig. 3, during the time interval from $t_1$ to $t_3$, the voltage represented by curve 107 is effective on the cathode of valve 51 and permits it to become conductive when the grid voltage is raised above cut-off. This occurs when the first positive cycle of the grid voltage, represented by curve 108, occurs after time $t_1$. As the grid voltage of valve 51 is alternately driven from below cut-off to above saturation, the anode voltage varies in accordance with curve 110 and consists of a series of rectangular pulses, until time $t_3$ when the valve is again rendered inoperative by the positive rise of the gate voltage on the cathode. Then, at time $t_5$ the cycle beings to repeat itself. On the negative excursions of the anode voltage, capacitance 55 is charged negatively, and since diode valve 61 is non-conducting in the direction that would discharge it into capacitance 63, the discharge occurs through resistance 57. However, on the positive excursions of the anode voltage, capacitance 55 is charged positively, and since diode valve 61 is conducting in that direction, it is practically instantaneously discharged into capacitance 63. The voltage across capacitance 63, consequently, rises practically instantaneously, as illustrated by the first vertical rise in curve 112 occurring after time $t_1$. The magnitude of the rise of the voltage across capacitance 63 is determined by the total change in the anode voltage of valve 51, and by the ratio of the magnitude of capacitance 55 to the magnitude of capacitance 63.

The voltage across capacitance 63 will continue to rise in discontinuous steps for each positive excursion of the anode voltage of valve 51. The voltage steps decrease in amplitude as the accumulated charge across capacitance 63 approaches the total voltage excursion of the anode of valve 51, but if capacitance 55 is small in comparison with capacitance 63, there is very little variation in the first few steps.

The circuit of valve 52 operates similarly, except that since diode valve 62 is connected to conduct in the opposite direction, only the negative excursions of the anode of valve 52 will be effective in applying a voltage to capacitance 63. Thus, after time $t_4$ and during the interval from $t_4$ to $t_6$ the negative gate voltage as illustrated by curve 106, applied to the cathode of valve 52, renders it operative. The anode voltage then follows a series of rectangular pulses as represented by curve 111. The negative excursions of the anode voltage will cause capacitance 56 to charge negatively and since diode valve 62 is conducting in that direction, a discharge into capacitance 63 occurs instantaneously. The voltage of capacitance 63 drops practically instantaneously, as illustrated by the first vertical drop in curve 112 occurring after time $t_4$, and continues to drop in discontinuous steps for each negative excursion of the anode voltage of valve 52 until time $t_6$, when the valve is rendered inoperative by the positive rise of the gate voltage.

The voltage across capacitance 63, which is the voltage available at the output terminals 89, is thus made to ascend or descend in small stair-steps occurring at equal intervals of time, as represented by curve 112.

While a specific embodiment has been shown and described, it will, of course, be understood that various modifications may be made without departing from the invention. Thus, for instance, the number of steps in a period of the stair-step voltage may be changed within wide limits. Moreover, while the invention lends itself readily to generating a symmetrical stair-step voltage, it is not limited thereto and the number of descending steps may be made different from the number of ascending steps by varying the pulse widths of the gate voltages and the relative values of capacitors 55 and 56. The appended claims are, therefore, intended to cover any modifications within the true spirit and scope of the invention.

What I claim as new and desire to secure by Letters Patent of the United States is:

1. In a stair-step generator, a source of alternating voltage of reference period, means for generating two symmetrical square-wave voltages each having said reference period, means for generating two substantially rectangular gate voltages of opposite phase each having a period containing a plural integral number of said reference periods, a pair of normally non-conducting electron discharge devices each having input and output circuits, one of said square wave voltages and one of said gate voltages being applied to a respective input circuit, each device passing a plurality of current pulses in its output circuit, corresponding to said square wave voltage, only during the applied gate voltage, a capacitor, and means for charging said capacitor in opposite directions in response to the current pulses in said respective output circuits.

2. In a stair-step generator, a source of alternating voltage of reference period, means for generating two symmetrical square-wave voltages each having said reference period, means for generating two substantially rectangular gate voltages of opposite phase each having a period containing a plural integral number of said reference periods, a pair of gate circuits each comprising an electron discharge device having input and output circuits, respective ones of said square wave voltages and said gate voltages being applied to each input circuit, each said device being normally biased beyond current cutoff and rendered conducting to pass square current pulses to its output circuit only when said applied voltages simultaneously have the required polarity, a capacitor, means for charging said capacitor in a positive direction in response to the current pulses in one of said circuits, and means for charging said capacitor in a negative direction in response to the current pulses in the other of said output circuits.

3. In a stair-step generator, a source of alternating voltage of reference period, means for generating two symmetrical square-wave voltages each having said reference period, means for generating two substantially rectangular gate voltages of opposite phase each having a period containing a plural integral number of said reference periods, a pair of gate circuits each comprising an electron discharge device having input and output circuits, respective ones of said square wave voltages and said gate voltages being applied to each input circuit, each said device being normally biased beyond current cutoff and rendered conducting to pass square current pulses to its output circuit only when said applied voltages simultaneously have the proper polarity, an integrating capacitor, a pair of rectifiers, means for impressing each of said series of current pulses upon said capacitor through a respective one of said rectifiers, said rectifiers being poled to charge said capacitor in opposite directions in response to said pulses.

4. In a stair-step generator, a source of alternating voltage of reference period, means for generating two symmetrical square-wave signal voltages each having said reference period and one being in reverse phase from the other, means for generating first and second symmetrical square-wave gate voltages each having a period containing an equal plurality of said reference periods and of opposite phase from each other, means for delaying said second gate voltage in phase by approximately one-half of one of said periods to form a third gate voltage, a pair of normally non-conducting electron discharge devices each having an input and an output circuit, means for impressing respective ones of said signal voltages, said first and said third gate voltages on each input circuit, each device passing a series of substantially square current pulses, corresponding to said signal voltages, in its output circuit only during the applied gate voltage, an integrating capacitor, a pair of rectifiers, means for impressing each of said series of current pulses upon said capacitor through a respective one of said rectifiers, said rectifiers being poled to charge said capacitor in opposite directions in response to said pulses.

5. In a stair-step generator, a source of alternating voltage of reference period, means for generating two symmetrical square-wave voltages each having said reference period and of opposite polarity, means for generating two substantially rectangular gate voltages of opposite phase each having a period containing a plurality of said reference periods, a pair of gate circuits each comprising an electron discharge device having input and output circuits, respective ones of said square wave voltages and said gate voltages being applied to each input circuit, each said device being normally biased beyond current cut-off and rendered conducting to pass square current pulses to its output circuit only when said applied voltages simultaneously have the required polarities, a capacitor, means for charging said capacitor in opposite directions in response to the current pulses in said respective output circuits, and means for relaying the phase of one of said gate voltages before application to one of said input circuits to control the waveform of voltage developed across said capacitor.

6. In a stair-step generator, a source of alternating voltage of reference period, means for generating two symmetrical square-wave voltages each having said reference period and of opposite polarity, means for generating two substantially rectangular gate voltages of opposite phase each having a period containing a plural integral number of said reference periods, a pair of normally non-conducting electron discharge devices each having input and output circuits, respective ones of said square wave voltages and said gate voltages being applied to each input circuit, each device passing a plurality of current pulses in its output circuit, corresponding to said square wave voltage, only during the applied gate voltage, an integrating capacitor, a pair of rectifiers, means for impressing each of said series of current pulses upon said capacitor through a respective one of said rectifiers, said rectifiers being poled to charge said capacitor in opposite directions in response to said series of pulses, and means for delaying the phase of one of said gate voltages before application to one of said input circuits to control the waveform of voltage developed across said capacitor.

7. A stair-step wave generator comprising a source of two recurrent waves, a source of two recurrent gating waves, each of said gating waves having a given polarity portion of a duration to include a plurality of recurrences of corresponding ones of said first named waves, said portions occurring substantially alternately in time, a storage circuit, means for alternately effecting a plurality of charges and discharges of said storage circuit within respective of said given polarity portions of said gating waves comprising means under control of respective ones of said gating waves during said given polarity portions for effecting the application of a given polarity portion of a corresponding one of said first named two waves to said storage circuit.

8. The combination, in a stair-step wave generator, of means to produce a first pair of periodic waves of opposite phase, means to produce a second pair of waves of opposite phase, the waves of one polarity of each of said second pair of waves having a duration greater than the period of the waves of the first pair, a storage circuit, means for alternately effecting a plurality of charges and discharges of said storage circuit within the period of said second pair of waves, said means comprising means controlled by the respective waves of said second pair to apply to said storage circuit corresponding waves of the first pair, one of said corresponding waves being applied to effect charging and the other to effect discharging of said storage circuit, whereby a stair-step wave appears across said storage circuit.

GEORGE M. BROWN.

REFERENCES CITED

The following references are of record in the file of this patent:

UNITED STATES PATENTS

| Number | Name | Date |
|---|---|---|
| 2,176,742 | La Pierre | Oct. 17, 1939 |
| 2,389,692 | Sherwin | Nov. 27, 1945 |
| 2,392,632 | Berry | Jan. 8, 1946 |
| 2,403,527 | Hershberger | July 9, 1946 |
| 2,428,913 | Hulst, Jr. | Oct. 14, 1947 |

Certificate of Correction

Patent No. 2,562,694

July 31, 1951

GEORGE M. BROWN

It is hereby certified that error appears in the printed specification of the above numbered patent requiring correction as follows:

Column 4, line 58, for "beings" read *begins*; column 6, line 17, after "said" insert *output*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*